United States Patent

Biggs et al.

[11] Patent Number: 5,876,772
[45] Date of Patent: Mar. 2, 1999

[54] PROCESS FOR THE PREPARATION OF A FOOD PRODUCT

[75] Inventors: Donald Reginald Biggs, Bedford, United Kingdom; Johannes Krieg, Rotterdam, Netherlands

[73] Assignee: Good Humor-Breyers Ice Cream, Division of Conopco, Inc., Green Bay, Wis.

[21] Appl. No.: 923,907

[22] Filed: Sep. 4, 1997

[30] Foreign Application Priority Data

Sep. 4, 1996 [EP] European Pat. Off. .............. 96306392

[51] Int. Cl.$^6$ ...................................... A21D 13/00
[52] U.S. Cl. ........................ 426/241; 426/139; 426/497
[58] Field of Search .................... 426/241, 497, 426/139

[56] References Cited

U.S. PATENT DOCUMENTS

| | | | |
|---|---|---|---|
| 3,696,734 | 10/1972 | Beasley et al. | 99/331 |
| 3,779,772 | 12/1973 | Forkner | 99/86 |
| 4,153,733 | 5/1979 | Pierce | 429/72 |
| 4,937,084 | 6/1990 | Julian et al. | 426/144 |
| 5,131,320 | 7/1992 | Jensen et al. | 99/422 |
| 5,248,512 | 9/1993 | Berberat et al. | 426/302 |
| 5,284,672 | 2/1994 | Ito | 426/139 |

FOREIGN PATENT DOCUMENTS

| | | |
|---|---|---|
| 2103774 | 2/1994 | Canada . |
| 107 289 | 5/1984 | European Pat. Off. . |
| 0393361 | 10/1990 | European Pat. Off. . |
| 0 561513 | 9/1993 | European Pat. Off. . |
| 582 922 | 2/1994 | European Pat. Off. . |
| 42 39 143 A1 | 7/1992 | Germany . |
| 94/23583 | 10/1994 | WIPO . |

OTHER PUBLICATIONS

European Search Report in the European Application 97200556 dated Jul. 11, 1997.
International Search Report in the PCT/EP Application 98/00820 dated Aug. 17, 1998.
PCT InternationalSearch Report in the PCT Patent Application PCT/EP 97/04572.

*Primary Examiner*—George Yeung
*Attorney, Agent, or Firm*—James J. Farrell

[57] ABSTRACT

A process for shaping a wafer comprising the steps of (a) softening the wafer by using infra-red radiation, (b) shaping the softened wafer into a desired form, and (c) cooling the shaped wafer.

14 Claims, No Drawings

PROCESS FOR THE PREPARATION OF A FOOD PRODUCT

TECHNICAL FIELD OF THE INVENTION

The invention relates to the manufacture of a food product. In particular it relates to the manufacture of a food product containing a wafer, whereby the wafer is formed into a different shape.

BACKGROUND OF THE INVENTION

It is well-known to produce food products containing a wafer. Examples of such products are ice-cream sandwiches, ice-cream cones, chocolate bars, sandwiched cookies etc.

Wafers are generally produced by introducing a batter into a hot mould followed by removing the wafer from the mould. If desired the wafer—while still hot—may then be formed into the desired shape. For example a flat hot wafer may be rolled into a cone shape.

Wafers generally have a crisp texture i.e. they tend to break when they are formed into a different shape for example by bending. To prevent this breaking the wafer needs to be softened prior to deformation. To ensure that the final shaped wafer has a crisp texture it is preferred that the softening of the wafer is a process which can easily be reversed.

One possible method of reversibly softening wafers is to heat the wafer. Heating to a temperature above the glass-transition point results in a soft wafer which can be shaped and then cooled to re-gain its crispness.

In industrial processes to shape wafers the application of heat, however leads to several problems.

Firstly, the reheating by using conventional means such as cooking plates or ovens requires a relatively long time. In a continuous process this leads to high costs e.g. for space and investments.

Also, long heating times lead to an undesirable continuation of the cooking process of the wafer, which may lead to over-cooked or even burnt wafers.

Thirdly the application of conventional heating means for softening wafers, renders it difficult to interrupt the production process for a short time, for example if at another stage of the production line some time is needed for changing or repairing a production element. Such an interruption would mean that the (hot) wafers would need to wait longer until they can be further processed. This again can lead to further overcooking and burning of the wafers.

The present invention aims at solving the above problems by providing a new method of reversibly softening wafers which method can be carried out in a short time and which can easily be interrupted.

Surprisingly it has been found that the use of infrared radiation leads to an adequate softening of the wafers, while the above mentioned problems do not occur.

DISCLOSURE OF THE INVENTION

Accordingly, the present invention relates to a process for shaping a wafer comprising the steps of:

a) softening the wafer by using infra-red radiation;

b) shaping the softened wafer into the desired form;

c) cooling the wafer.

For use in the process of the invention a wide number of wafer formulations can be used. It is well within the ability of the skilled person to determine which wafer compositions can suitably be used. Generally the wafers will be starch based e.g. made of wheat, rice, corn or other suitable flour. Other ingredients such as sugar, flavouring, emulsifier, milk ingredients, fat etc can be added. Preferably wafers are crisp at ambient temperature and have a thickness of less than 3 mm, for example from 0.5 to 2.5 mm.

Infra-red radiation suitably to be used in the process of the invention will preferably have a peak wavelength of between 0.7 and 10 $\mu$m. Especially useful is the use of infra-red radiation in the wave band i.e. having a peak wavelength from 1.0 to 5.0 $\mu$m. Especially preferably is the use of infra-red having a peak wavelength of from 1.1 to 3.0 $\mu$m. Shorter wavelengths may lead to too much heating of the surface of the wafer, while longer wavelengths can lead to undesirable further cooking of the wafer.

Any suitable source of Infra-red radiation can be used. Preferably infra-red lamps are used for example such as available from Heraeus Noblelight Gmbh. Especially preferred is the use of infra-red lamps having a rod shape. These can conveniently be mounted above and parallel to a moving support (e.g. a conveyor belt) therewith providing an even heating of the wafer while it is passed through the zone below the infra-red lamps. Further preferred is the use of twin tube infra-red lamps containing a gold reflection plating. Most preferred is the use of fast response infra-red emmiters.

The temperature of the infra-red lamps should preferably be in the range of 900° C. to 2500° C., more preferably from 1600° C. to 2000° C.

Preferably the wafers are radiated with infra-red radiation for a period of 5 to 60 seconds, more preferred 10 to 40 seconds, most preferred 12 to 25 seconds. Preferably the upper surface of the wafer will reach a temperature of at least 110° C., more preferred from 120° to 170° C., most preferred from 130° to 150° C. For improving the thermal conductivity of the wafer for some uses it may be advantageous to pre-coat the wafer with a conductive edible material e.g. oil or fat.

The wafer can then be shaped into the desired form. For example it can be rolled, folded, bent etc. If desired the wafers can also be filled during or after the shaping into the desired shape. For example the soft wafer may be folded around a core of a food material e.g. a block of ice-cream. The shaping of the soft wafer around a food-core has the additional benefit of leading to a very good contact between the wafer and the filling because during the cooling process an effective adhesion between the filling and the wafer can occur. This leads to a reduced tendency for the wafer to break or soften during subsequent handling.

Suitable fillings include for example chocolate, mousse, cream and ice-cream. In particular this process can be used for the production of an ice-cream product.

Cooling of the wafer can take place by any suitable method. Most conveniently the wafer is let to cool for a certain period at low temperatures e.g. ambient temperatures or below.

The invention will now be illustrated by means of the following examples:

EXAMPLE I

Flat round wafers were produced from a batter of the following composition:

|  | % |
| --- | --- |
| Flour | 38.82 |
| Sucrose | 18.63 |
| Treacle | 3.88 |
| Invert sugar | 1.79 |
| Oil and Lecithin | 1.00 |
| Salt | 0.93 |
| Water | 34.95 |

The wafers were baked to a thickness of 2 mm and a diameter of 11 cm for approx 60 seconds in a waffle iron having a temperature of approx 200° C. The resulting wafer was light brown and crisp.

The wafers were cooled to ambient temperature and stored for further usage in accordance to the invention.

EXAMPLE II

The wafers of example I were positioned on a conveyor belt. 6 cm above the conveyor belt were rod shaped Infra-red lamps (ex Heraeus, type fast response infra-red twin tubes) which were operated at a temperature of 1800° C. The speed of the conveyor belt was regulated such that the wafers were kept for 18 s in the heating zone. At the end of the heating zone the upper surface of the wafer had a temperature of 140° C. and the wafer was completely softened.

The softened wafer was removed from the conveyor belt and rolled into a hollow tube having a length of 11 cm and a diameter of 2 cm.

The wafer was then cooled and stored for further use. In use the wafer was filled with a bakery cream and served.

EXAMPLE III

The wafers of example I were positioned on a conveyor belt as example II. Above the conveyor belt were two different types of rod shaped Infra-red lamps, serial positioned, (ex Heraeus, type fast response infra-red twin tubes) which were operated at different temperatures resp. 2000° C. and 1600° C. The speed of the conveyor belt was regulated such that the wafers were kept for resp. 10 and 15 s in the heating zones. At the end of the heating zone the upper surface of the wafer had a temperature of 140° C. and the wafer was completely softened.

The softened wafer was removed from the conveyor belt and shaped into the required shape.

The wafer was then cooled and stored for further use.

EXAMPLE IV

The wafers of example I were heated as in example II.

A: the wafer was rolled into a cone shape.

B: the softened wafer was folded around a slice of ice-cream having the shape of a semi-circle. The resulting product was a filled ice-cream taco.

C: as B, but now the slice of ice-cream was pre-coated with a layer of chocolate.

We claim:

1. A process for shaping a wafer comprising the steps of:
   a) softening the wafer by using infra-red radiation;
   b) shaping the softened wafer into a desired form; and
   c) cooling the shaped wafer.

2. A process according to claim 1 wherein the infra-red radiation has a peak wavelength of between 0.7 and 10 μm.

3. A process according to claim 1 wherein the infra-red radiation is provided by one or more infra-red lamps.

4. A process according to claim 3 wherein the infra-red lamp or lamps have a temperature of from 900° C. to 2500° C.

5. A process according to claim 1 wherein the wafer is radiated with infra-red radiation for a period of from 5 to 60 seconds.

6. A process according to claim 1 wherein the upper surface of the wafer during exposure to the infra-red raidation reaches a temperature of at least 110° C.

7. A process according to claim 1 wherein the upper surface of the wafer during exposure to the infra-red radiation reaches a temperature of from 120° C. to 170° C.

8. An ice-cream product comprising a shaped wafer and ice-cream wherein the wafer has been shaped using the process according to claim 1.

9. A process according to claim 1 wherein the infra-red radiation has a peak wavelength of 1.0 to 10 μm.

10. A process according to claim 1 wherein the infra-red radiation has a peak wavelength of 1.1 to 3.0 μm.

11. A process according to claim 3 wherein the infra-red lamp or lamps has a temperature of 1600° C. to 2000° C.

12. A process according to claim 1 wherein the wafer is radiated with infra-red radiation for a period of 10 to 40 seconds.

13. A process according to claim 1 wherein the wafer is radiated with infra-red radiation for a period of 12 to 25 seconds.

14. A process according to claim 1 wherein the upper surface of the wafer during exposure to the infra-red radiation reaches a temperature of 130° C. to 150°0 C.

* * * * *